United States Patent
Yang et al.

(10) Patent No.: US 10,742,802 B2
(45) Date of Patent: Aug. 11, 2020

(54) METHODS AND DEVICES FOR VERIFYING A COMMUNICATION NUMBER

(71) Applicant: SHANGHAI ZHANGXIAN NETWORK TECHNOLOGY CO., LTD., Shanghai (CN)

(72) Inventors: Hui Yang, Shanghai (CN); WeiXiong Chen, Shanghai (CN); Chao Chen, Shanghai (CN)

(73) Assignee: SHANGHAI ZHANGXIAN NETWORK TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/509,511

(22) Filed: Jul. 12, 2019

(65) Prior Publication Data

US 2019/0342448 A1 Nov. 7, 2019

Related U.S. Application Data

(63) Continuation of application No. PCT/CN2017/113455, filed on Nov. 29, 2017.

(30) Foreign Application Priority Data

Jan. 17, 2017 (CN) .......................... 2017 1 0031832

(51) Int. Cl.
*H04M 3/42* (2006.01)
*H04L 29/06* (2006.01)

(52) U.S. Cl.
CPC .... *H04M 3/42068* (2013.01); *H04L 63/0876* (2013.01); *H04L 63/126* (2013.01)

(58) Field of Classification Search
CPC .......... H04M 3/42068; H04L 63/0876; H04L 63/126; H04W 76/02
(Continued)

(56) References Cited

U.S. PATENT DOCUMENTS 7,606,358 B2 * 10/2009 McGary .............. H04M 3/5183
379/218.01
8,090,878 B2 * 1/2012 Pallipuram ........... G06F 16/273
709/248
(Continued)

FOREIGN PATENT DOCUMENTS

CN 104270354 A 1/2015
CN 105721511 A * 6/2016
(Continued)

*Primary Examiner* — Binh Kien Tieu
(74) *Attorney, Agent, or Firm* — Kilpatrick Townsend & Stockton LLP (57) ABSTRACT

The object of the present application is to provide a method and device for verifying a communication number. Compared with the prior art, the present application includes: a user equipment transmitting a verification request to a network device; the network device transmitting an auxiliary verification number to the user equipment based on the verification request; the user equipment initiating a verification call to the auxiliary verification number via the communication number; the network device obtaining a call record of the auxiliary verification number and determining the verification result based on the call record of the auxiliary verification number. In this way, operator fees would not be caused at both the user equipment and the network device, thus greatly saving costs.

10 Claims, 2 Drawing Sheets

(58) Field of Classification Search
USPC .......... 379/142.05, 142.06, 142.17; 455/411, 455/414.1
See application file for complete search history.

(56) References Cited

U.S. PATENT DOCUMENTS

| | | | | |
|---|---|---|---|---|
| 8,171,305 | B2* | 5/2012 | Menk | H04M 3/382 |
| | | | | 379/219 |
| 10,313,870 | B2* | 6/2019 | Liu | H04L 63/0876 |
| 10,506,088 | B1* | 12/2019 | Singh | G10L 15/00 |
| 2007/0190976 | A1* | 8/2007 | Hoshino | H04L 63/08 |
| | | | | 455/411 |
| 2013/0281057 | A1* | 10/2013 | Bender | H04M 3/42382 |
| | | | | 455/411 |
| 2013/0324083 | A1* | 12/2013 | Celi, Jr. | H04W 12/06 |
| | | | | 455/411 |
| 2015/0365514 | A1* | 12/2015 | Li | H04M 1/57 |
| | | | | 455/414.1 |
| 2017/0208464 | A1* | 7/2017 | Guertler | G06Q 20/42 |
| 2018/0184289 | A1* | 6/2018 | Dudley | H04W 8/26 |
| 2018/0191901 | A1* | 7/2018 | Aleksin | G06Q 30/016 |
| 2019/0075458 | A1* | 3/2019 | Kulakowski | G06F 21/313 |

FOREIGN PATENT DOCUMENTS

| | | |
|---|---|---|
| CN | 105721511 A | 6/2016 |
| CN | 106130956 A | 11/2016 |
| KR | 20160031342 A | 3/2016 |

* cited by examiner

METHODS AND DEVICES FOR VERIFYING A COMMUNICATION NUMBER

PRIORITY CLAIM

This application is the Continuation Application of International Application No. PCT/CN2017/113455, filed on Nov. 29, 2017, which claims priority to Chinese Patent Application No. 201710031832.3, filed on Jan. 17, 2017, both of which are incorporated by reference in their entireties for any and all purposes.

FIELD

The present application relates to a technical field of communication technology, and particularly relates to a technology for verifying a communication number.

BACKGROUND

With the popularity of various applications in user equipment, users are increasingly dependent on the use of applications. In many cases, these applications are bound to the user's mobile phone number. For the user's information security, the user's mobile phone number usually requires authenticating.

At present, a general method for verifying the user's mobile phone number is: the client application guides the user to fill in the mobile phone number to be verified, generates a verification code corresponding to the mobile phone number of the user by a network device, and calls the operator interface to send the verification code to the user equipment via a downlink short message by the network device. The user then fills in the verification code, and the client application automatically parses the short message to fill in the verification code and uploads it to the network device for verification. The main problem of this approach is that the cost is relatively high for each verification SMS. The verification of the mobile phone number of a large number of users will cause a large amount of costs. Therefore, this problem needs to be solved urgently.

CONTENTS OF THE INVENTION

The object of the present application is to provide a method and device for verifying a communication number.

According to an aspect of the present application, it is provided a method for verifying a communication number at a network device, the method comprising:
receiving a verification request transmitted from a user equipment;
transmitting an auxiliary verification number to the user equipment based on the verification request, so that the user equipment initiating a verification call to the auxiliary verification number via the communication number;
obtaining a call record of the auxiliary verification number, and determining the verification result based on the call record of the auxiliary verification number.

According to another aspect of the present application, it is also provided a method for verifying a communication number at a user equipment, the method comprising:
transmitting a verification request to a network device;
receiving an auxiliary verification number transmitted by the network device based on the verification request;
initiating a verification call to the auxiliary verification number via the communication number so that the call record of the auxiliary verification number includes the communication number.

According to a further aspect of the present application, it is also provided a network device for verifying a communication number, the network device comprising:
a second means for receiving a verification request transmitted from a user equipment;
a fourth means for transmitting an auxiliary verification number to the user equipment based on the verification request, so that the user equipment initiating a verification call to the auxiliary verification number via the communication number;
a sixth means for obtaining a call record of the auxiliary verification number, and determining the verification result based on the call record of the auxiliary verification number.

According to a further aspect of the present application, it is also provided a user equipment for verifying a communication number, the user equipment comprising:
a first means for transmitting a verification request to a network device;
a third means for receiving an auxiliary verification number transmitted by the network device based on the verification request;
a fifth means for initiating a verification call to the auxiliary verification number via the communication number so that the call record of the auxiliary verification number includes the communication number.

Compared with the prior art, the present application includes: a user equipment transmitting a request for verification to a network device; the network device transmitting an auxiliary verification number to the user equipment based on the request for verification; the user equipment initiating a call to the auxiliary verification number for verification via the communication number; the network device obtaining the call record of the auxiliary verification number and determining the verification result based on the call record of the auxiliary verification number. In this way, operator fees would not be caused by both the user equipment and the network device, thus greatly saving costs.

Further, the present application obtains the call record of the auxiliary verification number when a trigger condition is satisfied, and determines the verification result based on the call record of the auxiliary verification number.

In this way, the network device performs the corresponding verification only when the trigger condition is satisfied, which saves the network overhead of the network device.

DESCRIPTIONS OF THE DRAWINGS

Other features, objects, and advantages of the present invention will become more apparent by reading the detailed description of non-limiting embodiments with reference to the following drawings.

The identical or similar reference numerals in the drawings represent the identical or similar components.

DETAILED EMBODIMENTS

The invention is further described in detail below with reference to the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and a carrier.

To further set forth the technical measures taken and the technical effect achieved of the present application, a clear and complete description of the technical solution of the present application is as follows in connection with the drawings and embodiments.

Figure 1:
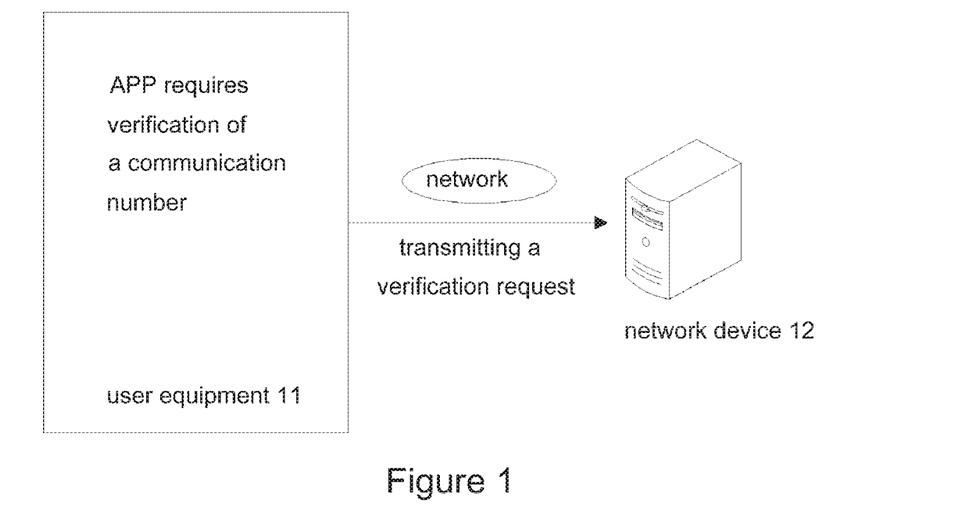
FIG. 1 shows a schematic diagram of a specific implementation environment of a method for verifying a communication number according to one embodiment of the application.

FIG. 1 shows a schematic diagram of a specific implementation environment of verifying a communication number according to one embodiment of the application. Here, the user equipment 11 is a device equipped with an application which requires verification of a communication device, including but not limited to various types of intelligent terminals, for example an intelligent mobile phone, a mobile intelligent device, a personal computer, and the like. The network device 12 is operable to cooperate with the user equipment 11 to perform verification of the communication number, wherein the network device 12 includes but is not limited to various types of mobile intelligent devices, personal computers, network hosts, a single network server, a cloud formed by multiple network server sets or multiple servers. Cloud as used herein is formed by a massive amount of computers or network servers based on cloud computing, wherein cloud computing is a type of distributed computing, which is a virtual super computer composed of a group of loosely coupled computer sets.

In practical applications, when the user launches the application which requires verification of the communication number, the user equipment 11 can automatically trigger a verification request to be transmitted to the network device 12 for verification of the communication number. Or the verification request can be triggered manually by the user and the user equipment 11 transmits the verification request to the network device 12 via a network connection established with the network device 12 to implement the verification of the communication number.

Figure 2:
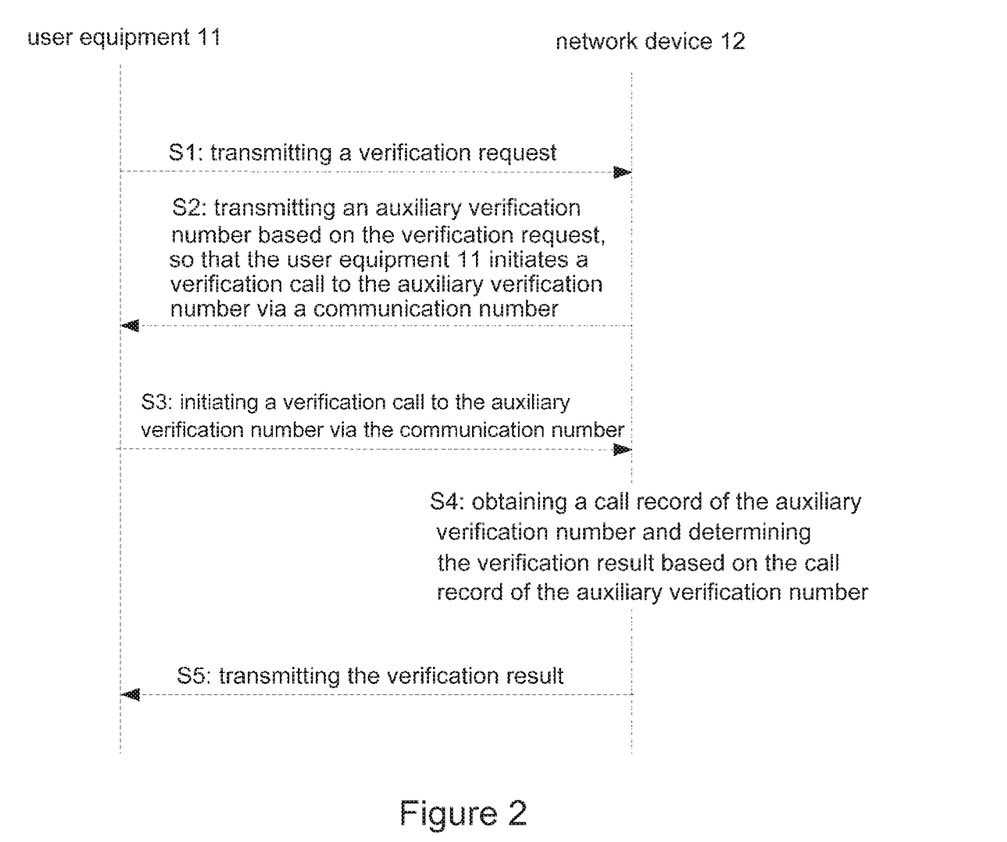
FIG. 2 shows a flowchart of a method for verifying a communication number according to an aspect of the present application.

FIG. 2 shows a method for verifying a communication number between the network device 12 and the user equipment 11 provided according to an aspect of the present application, wherein the user equipment 11 and the network device 12 cooperate with each other to implement the verification of the communication number. The method comprises:

Step S1, the user equipment 11 transmits a verification request to the network device 12. Correspondingly, the network device 12 receives the verification request.

Step S2, the network device 12 transmits an auxiliary verification number to the user equipment 11 based on the verification request, so that the user equipment 11 can initiate a verification call to the auxiliary verification number via the communication number. Correspondingly, the user equipment 11 receives the auxiliary verification number transmitted by the network device 12 based on the verification request.

Step S3, the user equipment 11 initiates a verification call to the auxiliary verification number via the communication number so that the call record of the auxiliary verification number includes the communication number.

Step S4, the network device 12 obtains a call record of the auxiliary verification number, and determines the verification result based on the call record of the auxiliary verification number.

Step S5, the network device 12 transmits the verification result to the user equipment 11.

In the embodiment, in step S1, the user equipment 11 transmits a verification request to the network device 12. Correspondingly, the network device 12 receives the verification request. Here, the verification request is to obtain the auxiliary verification number for assisting verification. The verification requests may contain information identifying the user equipment, for example, including but not limited to, a registered user account, user identity information, identifying information of the user equipment (such as device identifying information or communication number to be verified, and the like). Specifically, the user equipment 11 transmits the verification request to the network device 12 through a network connection established between with the network device 12 and respective communication protocol. Correspondingly, the network device 12 receives the verification request.

Continued with the embodiment, in step S2, the network device 12 transmits an auxiliary verification number to the user equipment 11 based on the verification request, so that the user equipment 11 can initiate a verification call to the auxiliary verification number via the communication number. Correspondingly, the user equipment 11 receives the auxiliary verification number transmitted by the network device 12 based on the verification request.

Here, the communication number includes but is not limited to a mobile phone number. The auxiliary verification number is used to assist verification of the communication number. For example, the auxiliary verification number is a number assigned for the network device 12 from a number library. The user equipment 11 can initiate a verification call to the number via the communication number.

Continued with the embodiment, in step S3, the user equipment 11 initiates a verification call to the auxiliary verification number via the communication number so that the call record of the auxiliary verification number includes the communication number. By performing the step, the call record of the auxiliary verification number contains the communication number, so that the network device 12 can determine that the call record contains the communication number by checking the call record. In one embodiment, the user equipment 11 will hang up the verification call in time after initiating the verification call to avoid being answered. Or the network device 12 will hang up the verification call upon detection of the verification call to the auxiliary verification number initiated by the user equipment via the communication number. In this way, it is possible to prevent the verification call from being answered, thereby saving communication costs.

Continued with the embodiment, in step S4, the network device 12 obtains the call record of the auxiliary verification number and determines the verification result based on the call record of the auxiliary verification number. Specifically, for example, when there is a call record of the auxiliary verification number, it is proved that there is a call to the auxiliary verification number initiated via the communication number and it is usually determined that the corresponding communication number in the call record passes the verification. Further, in step S5, the network device 12 transmits the verification result to the user equipment 11. The verification result can include passing the verification or not passing the verification. Or the verification result can include the communication number used to initiate the call to the auxiliary verification number or an account registered via the communication number by the user. Here, the verification results are merely exemplary and other existing or further verification results may fall within the scope of the present application as applied to the present application and are incorporated herein by reference.

In one embodiment, the verification request includes identifying information of the user equipment and the auxiliary verification number corresponds to the identifying information. The step S4 includes: obtaining the call record of the auxiliary verification number corresponding to the identifying information and determining that the verification result of the call record containing the communication number is passing the verification according to the call record. Here, the identifying information includes but is not limited to the identifying information of the user equipment or the communication number to be verified.

For example, in some cases, when the identifying information includes the communication to be verified, e.g., the mobile phone number, the user equipment 11 transmits the verification request including the communication verification number to the network device 12. Further in step S2, the network device 12 transmits an auxiliary verification number to the user equipment 11 based on the verification request.

In one embodiment, step S2 includes: the network device 12 obtains a non-occupied number from the number library, utilizes the non-occupied number as the auxiliary verification number, bonds the identifying information of the user equipment to the auxiliary verification number so that the auxiliary verification number corresponds to the identifying information, and transmits the auxiliary verification number to the user equipment. In such cases, the communication number is bound with the auxiliary verification number. Therefore, in step S4, the network device 12 obtains the call record of the auxiliary verification number corresponding to the communication number, and determines that the verification has been passed if the call record contains the communication number.

For example, in other cases, when the identifying information contains the device identification information, e.g., mobile device identification code, then the user equipment 11 transmits the verification request including the device identification number to the network device 12. Further, in step S2, the network device 12 obtains an non-occupied number from the number library, utilizes the non-occupied number as the auxiliary verification number, bonds the device identification number to the auxiliary verification number so that the auxiliary verification number corresponds to the device identification number, and transmits the auxiliary verification number to the user equipment.

In another embodiment, step S4 includes: obtaining the call record of the auxiliary verification number when a trigger condition is satisfied, and determining the verification result based on the call record of the auxiliary verification number. In such cases, the network device 12 may not actively perform verification on the communication number, but rather perform the verification upon satisfaction of a trigger condition.

In one embodiment, the trigger condition includes: receiving a query request transmitted from the user equipment, wherein the query request contains identifying information of the user equipment and the auxiliary verification number corresponding to the identifying information.

For example, when the identifying information of the user equipment includes device identification information, that is the auxiliary verification number corresponds to the device identification number, the user equipment 11 transmits the query request including the device identification information to the network device 12 after making a phone call to the auxiliary verification number to verify the query, the network device 12 determines the corresponding auxiliary verification number according to the device identification information included in the query request and obtains the call record of the auxiliary verification number corresponding to the device identification information so as to obtain the communication number calling the auxiliary verification number and determine that the communication number passes the verification.

In one embodiment, the method further comprises a step S6 (not shown), releasing the auxiliary verification number to make it as a non-occupied number after determining the verification result. The auxiliary verification numbers can be made available for verification of other communication numbers for resource saving.

Figure 3:
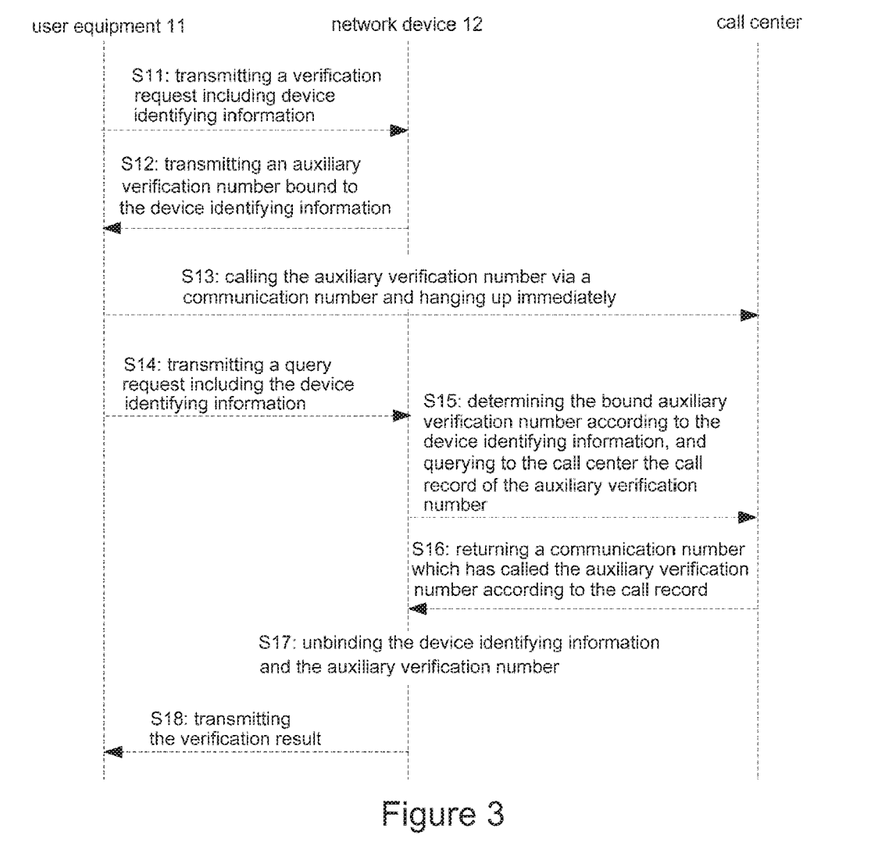
FIG. 3 shows a flowchart of a method for verifying a communication number of a user equipment according to another embodiment of the present application.

As in FIG. 3, it is shown a flowchart of a method for verifying a communication number of a user equipment according to another embodiment of the present application. Specifically, at step S11, the user equipment 11 transmits a verification request including the device identifying information to the network device 12, for example, mobile device identification code as the device identifying information, and then the network device 12 determines a non-occupied auxiliary verification number from the number library based on the verification request and bonds the auxiliary verification number to the device identifying information in the verification request. In step S12, the network device 12 transmits the auxiliary verification number bound to the device identifying information to the user equipment 11. Then in step S13, the user equipment 11 calls the auxiliary verification number via the communication number to be verified and hangs up immediately to prevent being answered for cost saving. Further, in step S14, the user equipment 11 transmits a query request including the device identifying information to query whether the verification is successful. In step S15, the network device determines the bound auxiliary verification number according to the device identifying information and queries the call record of the auxiliary verification number from the calling center. Then in step S16, a communication number which has called the auxiliary verification number is returned according to the call record, and it is determined that the communication number passes the verification. Further in step S17, the device identifying information and the auxiliary verification number is unbound and the auxiliary verification number is available for verification of other communication numbers. In step S18, the network device 12 transmits the verification result to the user equipment 11, for example, a communication number passing the verification or the registered account bound to the communication number, etc.

Compared with the prior art, the present application includes: a user equipment transmitting a request for verification to a network device; the network device transmitting an auxiliary verification number to the user equipment based on the request for verification; the user equipment initiating a call to the auxiliary verification number for verification via the communication number; the network device obtaining the call record of the auxiliary verification number and determining the verification result based on the call record of the auxiliary verification number. In this way, operator fees would not be caused by both the user equipment and the network device, thus greatly saving costs.

Further, the present application obtains the call record of the auxiliary verification number when a trigger condition is satisfied, and determines the verification result based on the call record of the auxiliary verification number. In this way, the network device performs the corresponding verification only when the trigger condition is satisfied, which saves the network overhead of the network device.

In some embodiments, all or some of the steps in the above method for verifying a communication number at a network device can be implemented by related hardware instructed by programs. The programs can be stored in a computer readable storage medium, when executed, include the following steps: receiving a verification request transmitted by the user equipment; transmitting an auxiliary verification number to the user equipment based on the verification request so that the user equipment initiates a verification call to the auxiliary verification number via the communication number; obtaining the call record of the auxiliary verification number and determining the verification result based on the call record of the auxiliary verification number; and transmitting the verification result to the user equipment. The storage medium is for example, ROM/RAM, a magnetic disk or an optical disk, etc.

In some embodiments, all or some of the steps in the above method for verifying a communication number at a user equipment can be implemented by related hardware instructed by programs. The programs can be stored in a computer readable storage medium, when executed, include the following steps: transmitting a verification request to a network device; receiving an auxiliary verification number transmitted by the network device based on the verification request; initiating a verification call to the auxiliary verification number via the communication number so that the call record of the auxiliary verification number contains the communication number; receiving the verification result determined by the network device based on the call record of the auxiliary verification number. The storage medium is for example, ROM/RAM, a magnetic disk or an optical disk, etc.

Figure 4:
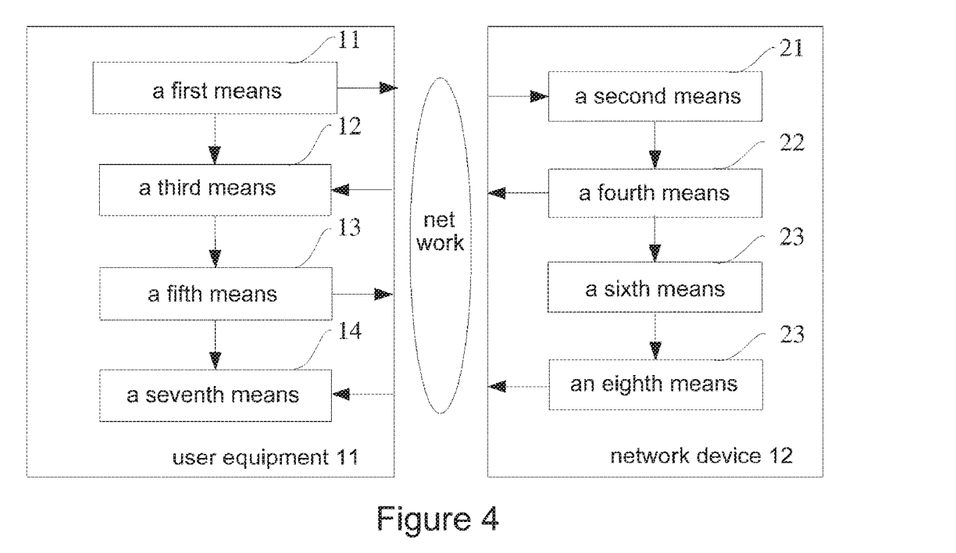
FIG. 4 shows a schematic diagram of a device for verifying a communication number according to another aspect of the present application.

FIG. 4 shows a schematic diagram of device for verifying a communication number between the network device 12 and the user equipment 11 provided according to another aspect of the present application, wherein the user equipment 11 and the network device 12 cooperate with each other to implement the verification of the communication number.

Specifically, a first means of the user equipment 11 transmits a verification request to the network device 12. Correspondingly, a second means of the network device 12 receives the verification request.

A fourth means of the network device 12 transmits an auxiliary verification number to the user equipment 11 based on the verification request, so that the user equipment 11 can initiate a verification call to the auxiliary verification number via the communication number. Correspondingly, a third means of the user equipment 11 receives the auxiliary verification number transmitted by the fourth means of the network device 12 based on the verification request.

A fifth means of the user equipment 11 initiates a verification call to the auxiliary verification number via the communication number so that the call record of the auxiliary verification number includes the communication number.

A sixth means of the network device 12 obtains a call record of the auxiliary verification number, and determines the verification result based on the call record of the auxiliary verification number.

An eighth means of the network device 12 transmits the verification result to the user equipment 11. Correspondingly, a seventh means of the user equipment 11 receives the verification result.

In the embodiment, the first means of the user equipment 11 transmits a verification request to the network device 12. Correspondingly, the second means of the network device 12 receives the verification request. Here, the verification request is to obtain the auxiliary verification number for assisting verification. The verification requests may contain information identifying the user equipment, for example, including but not limited to, a registered user account, user identity information, identifying information of the user equipment (such as device identifying information or communication number to be verified, and the like). Specifically, the first means of the user equipment 11 transmits the verification request to the network device 12 through a network connection established between with the network device 12 and respective communication protocol. Correspondingly, the second means of the network device 12 receives the verification request.

Continued in the embodiment, the fourth means of the network device 12 transmits an auxiliary verification number to the user equipment 11 based on the verification request, so that the user equipment 11 can initiate a verification call to the auxiliary verification number via the communication number. Correspondingly, the third means of the user equipment 11 receives the auxiliary verification number transmitted by the fourth means of the network device 12 based on the verification request.

Here, the communication number includes but is not limited to a mobile phone number. The auxiliary verification number is used to assist verification of the communication number. For example, the auxiliary verification number is a number assigned for the network device 12 from a number library. The user equipment 11 can initiate a verification call to the number via the communication number.

Continued in the embodiment, the fifth means of the user equipment 11 initiates a verification call to the auxiliary verification number via the communication number so that the call record of the auxiliary verification number includes the communication number. By the verification call, the call record of the auxiliary verification number contains the communication number, so that the network device 12 can determine that the call record contains the communication number by checking the call record. In one embodiment, the fifth means of the user equipment 11 will hang up the verification call in time after initiating the verification call to avoid being answered. Or the network device 12 will hang up the verification call upon detection of the verification call to the auxiliary verification number initiated by the user equipment via the communication number. In this way, it is possible to prevent the verification call from being answered, thereby saving communication costs.

Continued in the embodiment, the sixth means of the network device 12 obtains a call record of the auxiliary verification number, and determines the verification result based on the call record of the auxiliary verification number. Specifically, for example, when there is a call record of the auxiliary verification number, it is proved that there is a call to the auxiliary verification number initiated via the communication number and it is usually determined that the corresponding communication number in the call record passes the verification. Further, the eighth means of the network device 12 transmits the verification result to the user equipment 11. The verification result can include passing the verification or not passing the verification. Or the verification result can include the communication number used to initiate the call to the auxiliary verification number or an account registered via the communication number by the user. Here, the verification results are merely exemplary and other existing or further verification results may fall within the scope of the present application as applied to the present application and are incorporated herein by reference.

In one embodiment, the verification request includes identifying information of the user equipment and the auxiliary verification number corresponds to the identifying information. The sixth means is for: obtaining the call record of the auxiliary verification number corresponding to the identifying information and determining that the verification result of the call record containing the communication number is passing the verification according to the call record. Here, the identifying information includes but is not limited to the identifying information of the user equipment or the communication number to be verified.

For example, in some cases, when the identifying information includes the communication to be verified, e.g., the mobile phone number, the first means of the user equipment 11 transmits the verification request including the communication verification number to the network device 12. Further, the fourth means of the network device 12 transmits an auxiliary verification number to the user equipment 11 based on the verification request.

In one embodiment, the fourth means of the network device 12 is for: obtaining a non-occupied number from the number library, utilizing the non-occupied number as the auxiliary verification number, bonding the identifying information of the user equipment to the auxiliary verification number so that the auxiliary verification number corresponds to the identifying information, and transmitting the auxiliary verification number to the user equipment. In such cases, the communication number is bound with the auxiliary verification number. Therefore, the sixth means of the network device 12 obtains the call record of the auxiliary verification number corresponding to the communication number, and determines that the verification has been passed if the call record contains the communication number.

For example, in other cases, when the identifying information contains the device identification information, e.g., mobile device identification code, then the first means of the user equipment 11 transmits the verification request including the device identification information to the network device 12. Further, the fourth means of the network device 12 obtains an non-occupied number from the number library, utilizes the non-occupied number as the auxiliary verification number, bonds the device identification number to the auxiliary verification number so that the auxiliary verification number corresponds to the device identification number, and transmits the auxiliary verification number to the user equipment.

In another embodiment, the sixth means is for: obtaining the call record of the auxiliary verification number when a trigger condition is satisfied, and determining the verification result based on the call record of the auxiliary verification number. In such cases, the sixth means of the network device 12 may not actively perform verification on the communication number, but rather perform the verification upon satisfaction of a trigger condition.

In one embodiment, the trigger condition includes: receiving a query request transmitted from the user equipment, wherein the query request contains identifying information of the user equipment and the auxiliary verification number corresponding to the identifying information.

For example, when the identifying information of the user equipment includes device identification information, that is the auxiliary verification number corresponds to the device identification information, the fifth means of the user equipment 11 transmits the query request including the device identification information to the network device 12 after making a phone call to the auxiliary verification number to verify the query, the sixth means of the network device 12 determines the corresponding auxiliary verification number according to the device identification information included in the query request and obtains the call record of the auxiliary verification number corresponding to the device identification information so as to obtain the communication number calling the auxiliary verification number and determine that the communication number passes the verification.

In one embodiment, the network device 12 further comprises a tenth means (not shown) for releasing the auxiliary verification number to make it as a non-occupied number after determining the verification result. The auxiliary verification numbers can be made available for verification of other communication numbers for resource saving.

Compared with the prior art, the present application includes: a user equipment transmitting a request for verification to a network device; the network device transmitting an auxiliary verification number to the user equipment based on the request for verification; the user equipment initiating a call to the auxiliary verification number for verification via the communication number; the network device obtaining the call record of the auxiliary verification number and determining the verification result based on the call record of the auxiliary verification number. In this way, operator fees would not be caused by both the user equipment and the network device, thus greatly saving costs.

Further, the present application obtains the call record of the auxiliary verification number when a trigger condition is satisfied, and determines the verification result based on the call record of the auxiliary verification number. In this way, the network device performs the corresponding verification only when the trigger condition is satisfied, which saves the network overhead of the network device.

In some embodiments, it is apparent that the present application is not limited to the details of the above-mentioned exemplary embodiments, and the present application can be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method for verifying a communication number of a user equipment at a network device, comprising:
    receiving a verification request transmitted from the user equipment, wherein the verification request is used to request an auxiliary verification number from the network device for verifying the communication number of the user equipment;
    transmitting an auxiliary verification number to the user equipment based on the verification request, so that the user equipment initiating a verification call to the auxiliary verification number via the communication number, wherein the verification call to the auxiliary verification number is prevented from being answered by the user equipment or the network device;
    receiving a query request for verification result from the user equipment, wherein the query request includes equipment identification information of the user equipment corresponding to the auxiliary communication number;
    obtaining a call record of the auxiliary verification number, and determining the verification result based on a determination as to whether the call record of the auxiliary verification number includes the communication number of the user equipment; and
    transmitting the verification result to the user equipment.

2. The method as recited in claim 1, wherein the verification request including identifying information of the user equipment and the auxiliary verification number corresponding to the identifying information;
    wherein the step of obtaining a call record of the auxiliary verification number and determining the verification result based on the call record of the auxiliary verification number comprises:
    obtaining the call record of the auxiliary verification number corresponding to the identifying information;
    determining that the verification result of the call record containing the communication number is passing the verification according to the call record.

3. The method as recited in claim 1,
    wherein the step of obtaining the call record of the auxiliary verification number, and determining the verification result based on the call record of the auxiliary verification number comprises:
    obtaining the call record of the auxiliary verification number corresponding to the identifying information;
    determining that the verification result of the call record containing the communication number is passing the verification according to the call record.

4. The method as recited in claim 2, wherein the step of transmitting the auxiliary verification number to the user equipment based on the verification request so that the user equipment initiating a verification call to the auxiliary verification number via the communication number comprises:
    obtaining a non-occupied number from a number library and utilizing the non-occupied number as the auxiliary verification number;
    bonding the identifying information of the user equipment to the auxiliary verification number so that the auxiliary verification number corresponding to the identifying information;
    transmitting the auxiliary verification number to the user equipment.

5. The method as recited in claim 4, further comprising:
    releasing the auxiliary verification number to make it as a non-occupied number after determining the verification result.

6. The method as recited in claim 1, further comprising:
    hanging up the verification call upon detection of the verification call to the auxiliary verification number initiated by the user equipment via the communication number.

7. A method for verifying a communication number of a user equipment at the user equipment, comprising:
    transmitting a verification request to a network device, wherein the verification request is used to request an auxiliary verification number from the network device for verifying the communication number of the user equipment;
    receiving an auxiliary verification number transmitted by the network device based on the verification request; and
    initiating a verification call to the auxiliary verification number via the communication number so that the call record of the auxiliary verification number includes the communication number, wherein the verification call to the auxiliary verification number is prevented from being answered by the user equipment or the network device;
    transmitting a query request for verification result to the network device, wherein the query request includes equipment identification information of the user equipment corresponding to the auxiliary communication number; and
    receiving the verification result from the network device.

8. The method as recited in claim 7,
    wherein the verification result is determined by the network device based on a determination as to whether the call record of the auxiliary verification number includes the communication number of the user equipment.

9. The method as recited in claim 7, wherein the step of initiating a verification call to the auxiliary verification number via the communication number so that the call record of the auxiliary verification number includes the communication number comprises:
    hanging up the verification call.

10. An apparatus, comprising:
    a memory; and
    one or more processors executing instructions stored in the memory to cause the apparatus to:
    receive a verification request transmitted from a user equipment, wherein the verification request is used to request an auxiliary verification number from a network device for verifying the communication number of the user equipment;

transmit an auxiliary verification number to the user equipment based on the verification request, so that the user equipment initiating a verification call to the auxiliary verification number via the communication number, wherein the verification call to the auxiliary verification number is prevented from being answered by the user equipment or the network device;

receive a query request for verification result from the user equipment, wherein the query request includes equipment identification information of the user equipment corresponding to the auxiliary communication number;

obtain a call record of the auxiliary verification number, and determining the verification result based on a determination as to whether the call record of the auxiliary verification number includes the communication number of the user equipment; and transmit the verification result to the user equipment.

\* \* \* \* \*